(12) United States Patent
Choi et al.

(10) Patent No.: US 12,342,002 B2
(45) Date of Patent: Jun. 24, 2025

(54) ELECTRONIC DEVICE AND OPERATING METHOD THEREFOR

(71) Applicant: SAMSUNG ELECTRONICS CO., LTD., Suwon-si (KR)

(72) Inventors: Kilsoo Choi, Suwon-si (KR); Sehyun Kim, Suwon-si (KR); Jongin Lee, Suwon-si (KR); Jiwon Park, Suwon-si (KR); Hyunjin Park, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 12 days.

(21) Appl. No.: 18/117,285

(22) Filed: Mar. 3, 2023

(65) Prior Publication Data

US 2023/0209102 A1    Jun. 29, 2023

Related U.S. Application Data

(63) Continuation of application No. PCT/KR2021/011938, filed on Sep. 3, 2021.

(30) Foreign Application Priority Data

Sep. 4, 2020    (KR) .................. 10-2020-0113338

(51) Int. Cl.
*H04N 21/218*    (2011.01)
*H04N 21/43*    (2011.01)
(Continued)

(52) U.S. Cl.
CPC . *H04N 21/21805* (2013.01); *H04N 21/43072* (2020.08); *H04N 21/4312* (2013.01); *H04N 21/472* (2013.01)

(58) Field of Classification Search
CPC ....... H04N 21/21805; H04N 21/43072; H04N 21/4312; H04N 21/472; H04N 21/23614;
(Continued)

(56) References Cited

U.S. PATENT DOCUMENTS 8,189,987 B2    5/2012    Choi et al.
9,756,398 B2    9/2017    Lee
(Continued)

FOREIGN PATENT DOCUMENTS

JP    2016-122921 A    7/2016
KR    10-0231204 B1    11/1999
(Continued)

OTHER PUBLICATIONS

International Search Report (PCT/ISA/210 and PCT/ISA/220) and Written Opinion (PCT/ISA/237) dated Dec. 16, 2021 issued by the International Searching Authority in International Application No. PCT/KR2021/011938.
(Continued)

*Primary Examiner* — Alazar Tilahun
(74) *Attorney, Agent, or Firm* — Sughrue Mion, PLLC

(57) ABSTRACT

An operating method of an electronic apparatus includes receiving a request to record first content; based on the first content being outputtable in multi-view, obtaining multi-view information for outputting the first content in multi-view; and storing the multi-view information together with the first content.

15 Claims, 15 Drawing Sheets

(51) Int. Cl.
H04N 21/431 (2011.01)
H04N 21/472 (2011.01)

(58) Field of Classification Search
CPC ........... H04N 21/4147; H04N 21/4348; H04N 21/4622; H04N 21/4316; H04N 5/77; H04N 21/4325; H04N 21/4334; H04N 21/47214; H04N 21/8358; H04N 21/8547; H04N 21/41407; H04N 21/4343; H04N 21/47202; H04N 21/8455
See application file for complete search history.

(56) References Cited

U.S. PATENT DOCUMENTS

| | | | |
|---|---|---|---|
| 10,349,114 | B2 | 7/2019 | Templeman |
| 10,855,900 | B2 | 12/2020 | Kim |
| 2012/0284751 | A1* | 11/2012 | Kim ................ H04N 21/84 725/41 |
| 2013/0194296 | A1* | 8/2013 | Lee .................. G09G 5/14 345/619 |
| 2014/0282734 | A1* | 9/2014 | Stern ............... H04N 21/472 725/86 |
| 2015/0113568 | A1* | 4/2015 | Lee .................. H04N 21/4332 725/47 |
| 2015/0135206 | A1* | 5/2015 | Reisman .............. H04H 20/93 725/18 |
| 2018/0053280 | A1 | 2/2018 | Kim et al. |
| 2020/0169763 | A1 | 5/2020 | Burkhart et al. |

FOREIGN PATENT DOCUMENTS

| | | |
|---|---|---|
| KR | 10-2004-0069738 A | 8/2004 |
| KR | 10-0565042 B1 | 3/2006 |
| KR | 10-0770443 B1 | 10/2007 |
| KR | 10-1204513 B1 | 11/2012 |
| KR | 10-2013-0112101 A | 10/2013 |
| KR | 10-2015-0065490 A | 6/2015 |
| KR | 10-2015-0120326 A | 10/2015 |
| KR | 10-2016-0046719 A | 4/2016 |
| KR | 10-2016-0087225 A | 7/2016 |
| KR | 10-1758258 B1 | 7/2017 |
| KR | 10-2017-0091943 A | 8/2017 |
| KR | 10-2018-0019421 A | 2/2018 |
| KR | 10-2018-0064713 A | 6/2018 |
| KR | 10-2099594 B1 | 4/2020 |

OTHER PUBLICATIONS

Communication issued May 8, 2025 by the Korean Intellectual Property Office for Korean Patent Application No. 10-2020-0113338.

* cited by examiner

ELECTRONIC DEVICE AND OPERATING METHOD THEREFOR

CROSS-REFERENCE TO RELATED APPLICATIONS

This application is a by-pass continuation application of International Application No. PCT/KR2021/011938, filed on Sep. 3, 2021, which is based on and claims priority to Korean Patent Application No. 10-2020-0113338, filed on Sep. 4, 2020, in the Korean Intellectual Property Office, the disclosures of which are incorporated by reference herein in their entireties.

BACKGROUND

1. Field

The disclosure relates to an electronic apparatus and an operating method thereof, and more particularly, to an electronic apparatus capable of recording and reproducing content that is outputtable in multi-view, and an operating method of the electronic apparatus.

2. Description of Related Art

A multi-streaming technology for outputting a plurality of pieces of content together on a screen of a display device is being developed. The multi-streaming technology may refer to a technology that outputs various content together in a manner that a display screen is divided into a plurality of screens and different pieces of content are respectively displayed on the plurality of screens.

A user may record content by using a display device, a recording apparatus, or the like. At this time, in situations where only a single piece of content is recorded without considering that the content being recorded is outputtable together with other content by using a multi-streaming technology, the multi-streaming technology cannot be used when the recorded content is reproduced at a later time. Accordingly, there is a need for a technology for effectively recording and reproducing content for which the multi-streaming technology can be used.

SUMMARY

Provided is an operating method of an electronic apparatus which, according to an embodiment, may include receiving a request to record first content, based on determining that the first content is outputtable in multi-view, obtaining multi-view information for outputting the first content in multi-view, and storing the multi-view information together with the first content.

According to an aspect of the disclosure, a method of operating an electronic apparatus, includes: receiving a request to record first content; based on the first content being outputtable in multi-view, obtaining multi-view information for outputting the first content in multi-view; and storing the multi-view information together with the first content.

The method may further include: obtaining a multi-view identifier from at least one of a header of a transport stream, metadata, a frame of the first content, or an image generated from the first content; and based on obtaining the multi-view identifier, identifying the first content as being outputtable in multi-view.

The multi-view information may include second content related to the first content, and the obtaining the multi-view information may include: obtaining, from the multi-view identifier, an address of the second content on at least one streaming server; and accessing the at least one streaming server using the obtained address to obtain the second content from the at least one streaming server.

The multi-view information may include storage location information of second content related to the first content, and the obtaining the multi-view information may include obtaining, from the multi-view identifier, an address of the second content on at least one video on demand (VOD) server.

The multi-view information may further include a timestamp for synchronizing the first content and the second content, and the timestamp may include at least one of information about a total time to record the first content, information about a time point at which recording of the first content is started, or information about a time point at which the second content is outputtable in multi-view.

The method may further include: based on receiving a multi-view output request, obtaining second content related to the first content; outputting the first content and the second content in multi-view via a plurality of sub-screens of a display of the electronic apparatus; and storing a screen output in multi-view.

According to an aspect of the disclosure, a method of operating an electronic apparatus, includes: receiving a request to output recorded first content; and based on the first content being outputtable in multi-view and a multi-view output request being received, outputting the first content and second content related to the first content in multi-view via a plurality of sub-screens of a display of the electronic apparatus.

The outputting the first content and the second content in multi-view may include reading and outputting a pre-stored multi-view output screen.

The method may further include, based on a multi-view output screen for the first content not being pre-stored, obtaining the second content reading the second content that is pre-stored in the electronic apparatus by being streamed from at least one streaming server based on an address obtained from a multi-view identifier.

The method may further include, based on a multi-view output screen for the first content not being pre-stored, obtaining the second content by streaming the second content from a video on demand (VOD) server based on storage location information of the second content on the at least one VOD server.

The method may further include obtaining a first timestamp associated with the first content and a second timestamp associated with the second content, and the outputting the first content and the second content in multi-view may include synchronizing the first content and the second content using the first timestamp and the second timestamp.

According to an aspect of the disclosure, an electronic apparatus includes: a user interface; at least one memory storing one or more instructions; and at least one processor configured to execute the one or more instructions to: receive a request to record first content through the user interface, based on the first content being outputtable in multi-view, obtain multi-view information for outputting the first content in multi-view, and store the multi-view information together with the first content in the memory.

The at least one processor may be further configured to execute the one or more instructions to: obtain a multi-view identifier from at least one of a header of a transport stream, metadata, a frame of the first content, or an image generated from the first content, and based on obtaining the multi-view identifier, identify the first content as being outputtable in multi-view.

The multi-view information may include second content related to the first content, and the at least one processor may be further configured to execute the one or more instructions to: obtain, from the multi-view identifier, an address of the second content on at least one remote server, and obtain the second content by accessing the obtained address on the at least one remote server, and the at least one remote server may include at least one of a streaming server and a video on demand (VOD) server.

According to an aspect of the disclosure, a non-transitory computer-readable medium having instructions stored therein, which when executed by a processor cause the processor to execute a method of operating an electronic apparatus, includes: receiving a request to record first content; based on the first content being outputtable in multi-view, obtaining multi-view information for outputting the first content in multi-view; and storing the multi-view information together with the first content.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
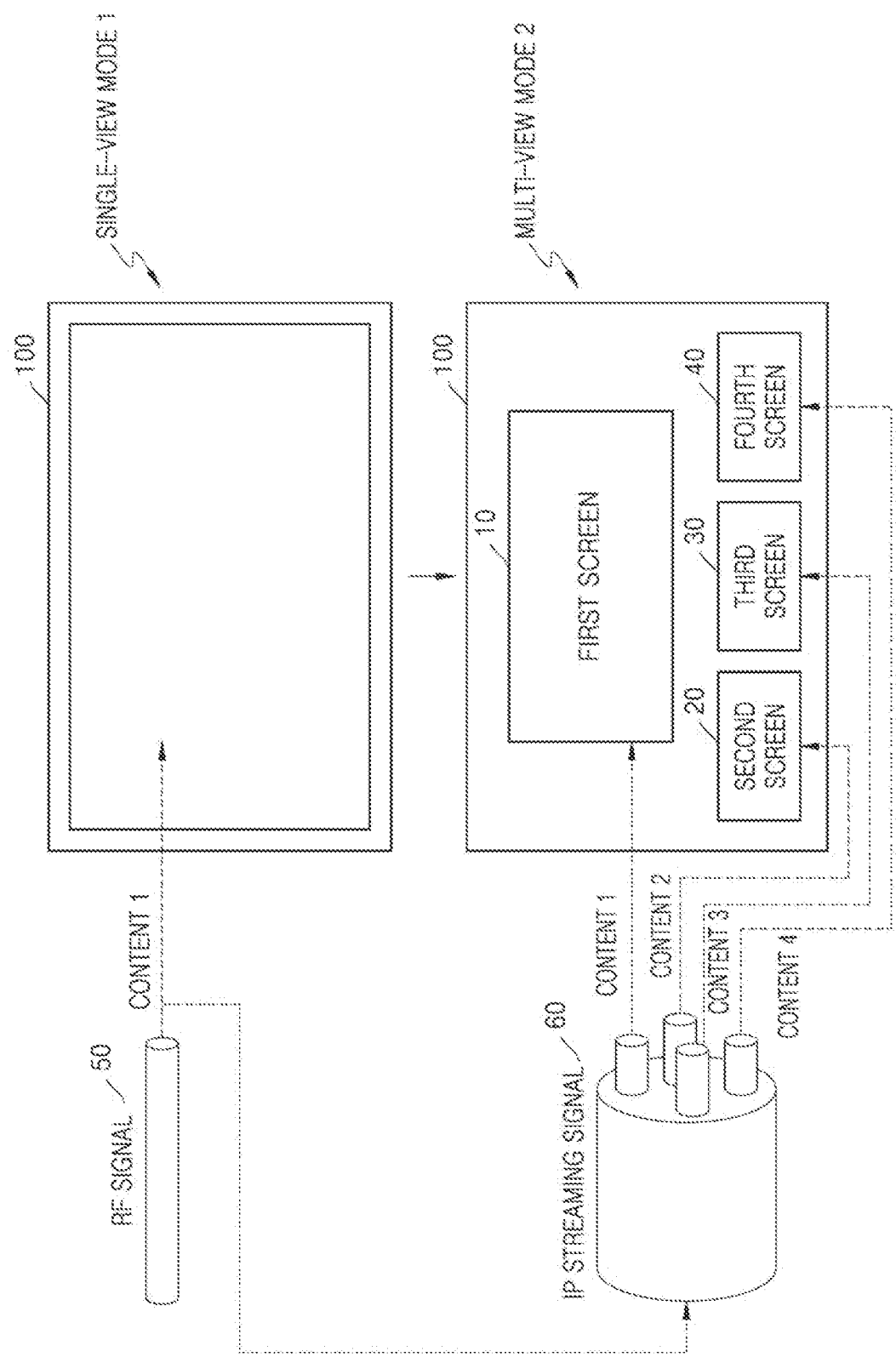
FIG. 1 is a diagram for explaining that an electronic apparatus according to an embodiment may operate in a single-view mode and a multi-view mode.

Hereinafter, embodiments of the disclosure will be described in detail with reference to the accompanying drawings. However, the disclosure may be embodied in many different forms and is not limited to the embodiments described herein.

In the disclosure, general terms that have been widely used are selected in consideration of functions of the disclosure, but various other terms may be selected according to the intentions of technicians in the art, precedents, new technologies, etc. Accordingly, the terms used herein should be defined not based on the names thereof but based on the meanings thereof and the whole context of the disclosure.

Also, the terms used herein are for the purpose of describing certain embodiments of the disclosure only and are not intended to be limiting of the disclosure.

Throughout the specification, when a component is referred to as being "connected" to another component, it will be understood to include that the component is "directly connected" to the other component or is "electrically connected" to the other component with another component therebetween.

In the specification and particularly in the claims, "the" and similar referents may be used to indicate both singular and plural forms. Operations for describing a method according to the disclosure may be performed in a suitable order unless the context clearly dictates otherwise. The disclosure is not limited to the order of the operations described.

The expressions "in some embodiments", "in an embodiment" and the like appearing in various parts of the specification are not necessarily referring to the same embodiment.

Some embodiments of the disclosure may be represented by functional block configurations and various operations. Some or all of functional blocks may be implemented by various numbers of hardware and/or software configurations for performing certain functions. For example, the functional blocks of the disclosure may be implemented by one or more microprocessors or by circuit configurations for a certain function. Also, for example, the functional blocks of the disclosure may be implemented in various programming or scripting languages. The functional blocks may be implemented in an algorithm executed by one or more processors. In addition, in the disclosure, the prior art may be employed for electronic configuration, signal processing, and/or data processing. The terms such as "mechanism", "element", "means", and "configuration" may be used widely and are not limited as mechanical and physical configurations.

In addition, lines or members connecting elements illustrated in the drawings are merely illustrative of functional connections and/or physical or circuit connections. In an actual device, connections between components may be represented by various functional connections, physical connections, or circuit connections that are replaceable or added.

In addition, the term such as " . . . unit" or " . . . module" refers to a unit that performs at least one function or operation, and the unit may be implemented as hardware or software or as a combination of hardware and software.

In addition, in the specification, the term "user" refers to a person who uses a display device, and may include a consumer, an evaluator, a viewer, an administrator, or an installer.

FIG. 1 is a diagram for explaining that an electronic apparatus according to an embodiment operates in a single-view mode and a multi-view mode.

Referring to FIG. 1, an electronic apparatus 100 may output content. In an embodiment, the electronic apparatus 100 may be a display device, such as a television, capable of performing a content recording function.

The electronic apparatus 100 may output content in a single-view mode 1 or in a multi-view mode 2. The single-view mode 1 may refer to a mode in which the electronic apparatus 100 displays a single piece of content on one single screen of a display. The content displayed in the single-view mode 1 may include at least one of broadcast content received as a radio frequency (RF) signal 50 directly from a broadcasting station, broadcast content received through an external source, or content received from a content providing server through the Internet.

In an embodiment, the electronic apparatus 100 may provide a multi-streaming service to provide a user with various content experiences. The multi-streaming service may refer to a service in which a display screen of the electronic apparatus 100 is divided into a plurality of areas and different pieces of content are provided in the divided areas, respectively. The multi-streaming service may be referred to as a multi-view service or a multi-screen service.

The electronic apparatus 100 may provide content in the multi-view mode 2 using a multi-streaming service. The electronic apparatus 100 may provide the content in the multi-view mode 2 by dividing a display into a plurality of screens and displaying different pieces of content on the divided screens, respectively. Each of the divided screens of the display in the multi-view mode 2 may be also referred to as a sub-screen.

The electronic apparatus 100 may provide main content and content related to the main content in each sub-area of the display. The content provided on the screens may be content from the same source or from different sources.

When the electronic apparatus 100 detects a multi-view identifier while displaying the content in the single-view mode 1, the electronic apparatus 100 may switch to the multi-view mode 2 and display the content. The multi-view identifier may be information indicating that content may be output in the multi-view mode 2.

When a broadcasting station or server that provides content generates content, the broadcasting station or the server may generate only one piece of content so that the content may be output only in the single-view mode 1. Alternatively, when the broadcasting station or the server generates content, the broadcasting station or the server further generates content related to the content so that the content and the related content may be output together in the multi-view mode 2.

Hereinafter, for convenience of explanation, one piece of content that may be output in the single-view mode 1 is referred to as first content, and content that is related to the first content and may be output in the multi-view mode 2 together with the first content is referred to as second content.

When there is the second content related to the first content, the broadcasting station or the server may generate a multi-view identifier for notifying that there is the second content related to the first content and include the multi-view identifier in the first content. In other words, the broadcasting station or the server may include the multi-view identifier in the RF signal 50 or an Internet Protocol (IP) streaming signal 60 and transmit the RF signal 50 or the IP streaming signal 60 to the electronic apparatus 100.

The multi-view identifier may be included in a header of a transport stream (TS), metadata about an audio signal or a video signal, or a frame of content generated from a TS, or when the frame of the content is output on a screen, may also be included and output on the screen. The multi-view identifier may be included in video content or audio content, in the form of a digital watermark, or may be included and output on the screen, in the form of a quick response (QR) code.

The electronic apparatus 100 may obtain the multi-view identifier from the signal transmitted from the broadcasting station or the server, and may identify that the first content is outputtable in multi-view using the multi-view identifier.

When the first content is outputtable in multi-view, the electronic apparatus 100 may switch to the multi-view mode 2 and output content. Alternatively, the electronic apparatus 100 may notify a user through a user interface or the like that the first content is outputtable in multi-view, and when receiving a multi-view output request from the user, may output the first content and the second content in the multi-view mode 2.

In the multi-view mode 2, the electronic apparatus 100 may output the first content displayed in the single-view mode 1 and the second content related to the first content together. The second content is photographed simultaneously with the first content, and may be photographed from an angle or direction different from that of the first content. For example, in the case of sports game content, such as baseball, content displayed on a plurality of sub-screens in the multi-view mode 2 may be content corresponding to a plurality of scenes that may be captured in the sports game content. For example, respective sub-screens of the multi-view mode 2 may display content that focuses on a batter, content that focuses on a catcher, content that focuses on a coach, and content that focuses on a crowd. As another example, in the case of content that relays a performance, each sub-screen of the multi-view mode 2 may display content that focuses on each performer who acts or plays in the corresponding performance.

Alternatively, the second content displayed in the multi-view mode 2 may include content providing additional information about the first content displayed in the single-view mode 1. For example, the additional information about the first content may include information about scores of a baseball game or teams in a baseball game broadcast, and may include information about performers and information about a performance in a performance relay broadcast.

The number of a plurality of screens provided in the multi-view mode 2 may vary. The number of sub-screens provided in the multi-view mode 2 may be 2, 3, or at least 4. In FIG. 1, four sub-screens are shown as an example. Referring to FIG. 1, the multi-view mode 2 may include a first screen 10, a second screen 20, a third screen 30, and a fourth screen 40.

First content included in the IP streaming signal 60 that is a source of signals of content provided on a plurality of screens in the multi-view mode 2 may be displayed through the first screen 10, second content may be displayed through the second screen 20, third content may be displayed through the third screen 30, and fourth content may be displayed through the fourth screen 40.

The arrangement of the plurality of screens provided in the multi-view mode 2 may vary. In FIG. 1, as an example, one screen is arranged at the center of the upper side of the display, and three screens are arranged in parallel in the lower side of the display.

The sizes of the plurality of screens provided in the multi-view mode 2 may be vary. The sub-screens may have the same size or different sizes.

A user may request the electronic apparatus 100 to record the first content while watching the first content. In this case, when a screen that is currently output is the single-view mode 1, the electronic apparatus 100 may record the first content that is output in the single-view mode 1. In an embodiment, when the electronic apparatus 100 obtains a multi-view identifier while recording the first content, the electronic apparatus 100 may identify that the first content is outputtable in multi-view. When the first content is outputtable in multi-view, the electronic apparatus 100 may notify the user that the first content is outputtable in multi-view, using a pop-up screen, an interface screen, or the like. In this case, the user may select to output the first content in the multi-view mode 2 or to continue to output the first content in the single-view mode 1.

First, it is assumed that the user continues to watch the first content in the single-view mode 1 even when the first content is outputtable in multi-view. In an embodiment, in a case where a multi-view output is possible, even when the user does not use the first content in multi-view, the electronic apparatus 100 may obtain multi-view information about the first content, based on detection of the multi-view identifier. In other words, the electronic apparatus 100 may store the multi-view information, separately from recording the first content. The multi-view information may refer to information for outputting the first content in multi-view. The multi-view information may be the second content related to the first content, or may include an address of the second content stored in a server.

The electronic apparatus 100 may stream the second content related to the first content, or may obtain, as multi-view information, an address on a server capable of streaming the second content at a later time and may store the multi-view information together with the first content.

In this case, when the user watches the recorded first content in the future, the user may watch the first content in the single-view mode 1 or in the multi-view mode 2 at a time point at which a multi-view output is possible. In other words, when the electronic apparatus 100 detects a multi-view identifier from the recorded first content while reproducing the recorded first content, the electronic apparatus 100 may identify a time point at which a multi-view output is possible and notify the user of the time point. When the user requests the multi-view output, the electronic apparatus 100 may read the pre-stored multi-view information and may output the first content in multi-view by using the multi-view information.

In another embodiment, it is assumed that during content recording, the user watches the first content in the multi-view mode 2 at a time point at which the first content is outputtable in multi-view. In this case, the electronic apparatus 100 may stream the second content related to the first content from a server to output content in the multi-view mode 2, and may output the first content and the second content respectively on sub-screens in the multi-view mode 2. In this case, the electronic apparatus 100 may record and store a screen itself output in the multi-view mode 2. In addition, separately from recording and storing the screen, the electronic apparatus 100 may separately store the first content and the second content.

In this case, in a case where the user wants to reproduce the recorded content in the future, when the user requests outputting of the first content in multi-view at the time point at which the multi-view output is possible, the electronic apparatus 100 may output multi-view using the pre-stored first and second content or may read and output the screen itself recorded in the multi-view mode 2. Alternatively, when the user requests outputting of the first content in single view, the electronic apparatus 100 may read only the pre-stored first content and output the first content in single view.

As such, according to an embodiment, the electronic apparatus 100 may store the multi-view information in addition to the first content when content is outputtable in multi-view.

According to an embodiment, in a case where the user wants to reproduce the recorded content, when the first content is outputtable in multi-view, the electronic apparatus 100 may output the first content in one of a single-view mode or a multi-view mode according to a mode selected by the user. Therefore, even when watching the recorded content, the user may watch the content in a desired viewing mode according to the user's taste as if using a live signal.

Figure 2:
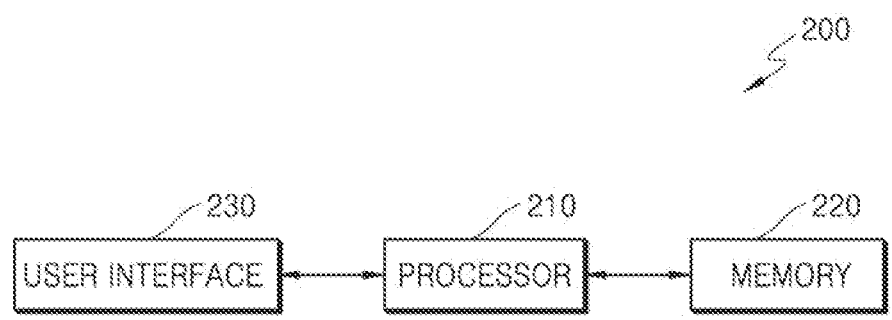
FIG. 2 is a block diagram of an electronic apparatus according to an embodiment.

FIG. 2 is an internal block diagram of an electronic apparatus according to an embodiment.

Referring to FIG. 2, an electronic apparatus 200 may include a processor 210, a memory 220, and a user interface 230.

In an embodiment, the electronic apparatus 200 may be a device capable of recording content. In an embodiment, the electronic apparatus 200 may be an image display device. Alternatively, in an embodiment, the electronic apparatus 200 may be a component that is included in an image display device and performs a content recording function. Alternatively, in an embodiment, the electronic apparatus 200 may be an electronic apparatus separate from an image display device, and may be connected to an image display device to record content received by the image display device.

The image display device may be a digital television (TV) capable of receiving digital broadcast, but is not limited thereto, and may be implemented as an electronic apparatus including a display.

The image display device may be of a fixed type or a mobile type. The image display device may be connected to a source device. The source device may include at least one of a personal computer (PC), a digital video disc (DVD) player, a video-game machine, a set-top box, an audio/video (AV) receiver, a cable receiver, a satellite broadcasting receiver, or an Internet receiver that receives content from an over-the-top (OTT) service provider or an IPTV service provider.

The OTT service provider or the IPTV service provider may provide digital TV services to consumers using IP over a broadband connection. Accordingly, the consumers may receive and use real-time broadcasts. In addition, these service providers may provide VOD services so that consumers may receive and use desired content in a streaming or download manner at a desired time. Hereinafter, a terrestrial broadcasting station, a cable broadcasting station providing, an OTT service provider, or an IPTV service provider, which provides content to consumers, is referred to as a content provider.

The image display device may receive content from the source device and output the content. In an embodiment, the content may include items, such as TV programs provided by content providers or various movies or dramas through VOD services, and may include at least one of a video signal, an audio signal, or a text signal.

When generating first content, a content provider may also generate second content related to the first content. The second content may include at least one piece of content related to the first content.

The content provider may take the same amount of time as the total time to output the first content to generate the second content that may be output in multi-view together with the first content, or may take only some of the time to output the first content to generate the second content that is outputtable in multi-view together with the first content.

In an embodiment, the content provider may generate a multi-view identifier to notify that the first content is outputtable in multi-view. The content provider may include the multi-view identifier in a header of a TS, metadata about the first content, a frame of the first content, or the like.

In an embodiment, the multi-view identifier may include address information of a server storing the second content related to the first content. The address information of the server storing the second content may be an address on a streaming server or an address on a VOD server.

When the first content and the second content are live signals, the content provider may generate the first content and transmit the first content to the image display device, and simultaneously transmit the second content to the streaming server live. For multi-view viewing in real time, when the image display device requests the second content from the streaming server, the streaming server may transmit the second content to the image display device. The image display device may output the first content and the second content together in multi-view. Afterwards, after a certain amount of time elapses, the second content may be deleted from the streaming server and may be stored in the VOD server.

The electronic apparatus 200 may be an image display device, or may be included in an image display device or connected to an image display device to record content received by the image display device from the content provider.

In an embodiment, the electronic apparatus 200 may include the user interface 230.

The user interface 230 according to an embodiment may receive a user input for controlling the electronic apparatus 200. The user interface 230 may include various input devices including, but is not limited to, a touch panel for detecting a touch of a user, a button for receiving a push operation of a user, a wheel for receiving a rotation operation of a user, a keyboard, a dome switch, a microphone for voice recognition, and a motion detection sensor for sensing a motion.

Alternatively, the electronic apparatus 200 may be controlled by a control device separated from the electronic apparatus 200, and the control device may be implemented as any of various devices for controlling the electronic apparatus 200, such as a remote controller or a portable phone. The control device may control the electronic apparatus 200 using short-range communication including infrared rays or Bluetooth. The control device may control a function of the electronic apparatus 200 through the user interface 230 using at least one of a provided key or button, a touchpad, a microphone capable of receiving a user's voice, or a sensor capable of recognizing a motion of the control device.

The control device may include a power on/off button for turning on or off the power of the electronic apparatus 200. In addition, the control device may perform, via a user input, channel changing, volume control, terrestrial broadcast/cable broadcast/satellite broadcast selection, or adjustment of settings of the electronic apparatus 200. In addition, the control device may be a pointing device. For example, the control device may operate as a pointing device when receiving a specific key input.

According to an embodiment, a user may control the electronic apparatus 200 through the user interface 230 to perform various functions of the electronic apparatus 200. In other words, a user may control the electronic apparatus 200 to record content received by the image display device or to stop recording of the content, and to schedule or change recording of the content in advance, using the user interface 230.

The memory 220 according to an embodiment may store at least one instruction. The memory 220 may store at least one program executed by the processor 210. The memory 220 may store a pre-defined operation rule or program. Also, the memory 220 may store data input to the electronic apparatus 200 or output from the electronic apparatus 200.

In an embodiment, the memory 220 may include a storage. The storage is a component that enables long-term data access and may include a solid state disk (SSD) or a hard disk drive (HDD). In an embodiment, when a user requests recording of the first content, the storage of the memory 220 may store the first content. In an embodiment, when content is outputtable in multi-view, the storage of the memory 220 may further store multi-view information required to output the content in multi-view. The multi-view information may be the second content itself related to the first content, or may include at least one of addresses of the second content on a server capable of streaming the second content. Also, in an embodiment, the multi-view information may include a timestamp for synchronizing one piece of content and the second content.

The memory 220 may include at least one type of storage medium of a flash memory type storage medium, a hard disk type storage medium, a multimedia card micro type storage medium, a card type memory (e.g., an SD or XD memory), a random-access memory (RAM), a static random-access memory (SRAM), a read-only memory (ROM), an electrically erasable programmable read-only memory (EEPROM), a programmable read-only memory (PROM), a magnetic memory, a magnetic disk, and an optical disk.

The processor 210 controls an overall operation of the electronic apparatus 200. The processor 210 may control the electronic apparatus 200 to function by executing one or more instructions stored in the memory 220.

In an embodiment, when the processor 210 receives a request to record content through the user interface 230, the memory 220 may store the first content.

In an embodiment, while the first content is recorded, the processor 210 may obtain a multi-view identifier for the first content. The multi-view identifier may be included in a header of a TS transmitted from a content provider or may be included in metadata about the first content. Alternatively, the multi-view identifier may be included in a frame of the first content or may be included in an image generated from the first content.

In an embodiment, when obtaining a multi-view identifier, the processor 210 may identify that content is outputtable in multi-view and may obtain and store multi-view information. The multi-view information may be the second content or an address of the second content stored in a server.

The processor 210 may obtain, from the multi-view identifier, at least one of an address on a streaming server storing the second content and/or an address on a VOD server. The second content is stored in the streaming server for a certain amount of time and then stored in the VOD server.

The processor 210 may obtain, from the multi-view identifier, the address of the second content on the streaming server, and may obtain the second content by accessing the address on the streaming server, for example, a URL, and streaming the second content. The processor 210 may store the obtained second content together with the first content in the storage storing the first content. Alternatively, in another embodiment, instead of streaming and storing the second content, the processor 210 may obtain a URL on the VOD server of the second content from the multi-view identifier and store only the address together with the first content.

In an embodiment, the multi-view information may include a timestamp for synchronizing the first content and the second content. The processor 210 may obtain at least one of pieces of information about the total time to record the first content, a time point at which recording of the first content is started, or a time point at which the second content is outputtable in multi-view based on a time point at which the first content starts to be recorded, and may include and store the at least one of pieces of information in the multi-view information.

In an embodiment, when a user requests a multi-view output while the first content is recorded, the processor 210 may obtain the second content from the streaming server and may output the first content and the second content together in multi-view using a plurality of sub-screens. In this case, the processor 210 may store a screen to be output in multi-view.

After the first content is recorded, when a user requests outputting of the recorded first content in multi-view, the processor 210 may read the second content related to the first content. When the second content has already been streamed and stored in the memory 220, the processor 210 may read and use the pre-stored second content to output a multi-view. When an address of the second content on a server is stored in the memory 220, the processor 210 may access the address on the server and stream the second content, and may output the streamed second content and the first content together in multi-view.

Alternatively, when the first content and the second content have already been recorded in multi-view, the processor 210 may read and output the pre-stored multi-view.

The processor 210 may obtain respective timestamps of the first content and the second content, and may output the first content and the second content that are synchronized by using the respective timestamps.

Figure 3:
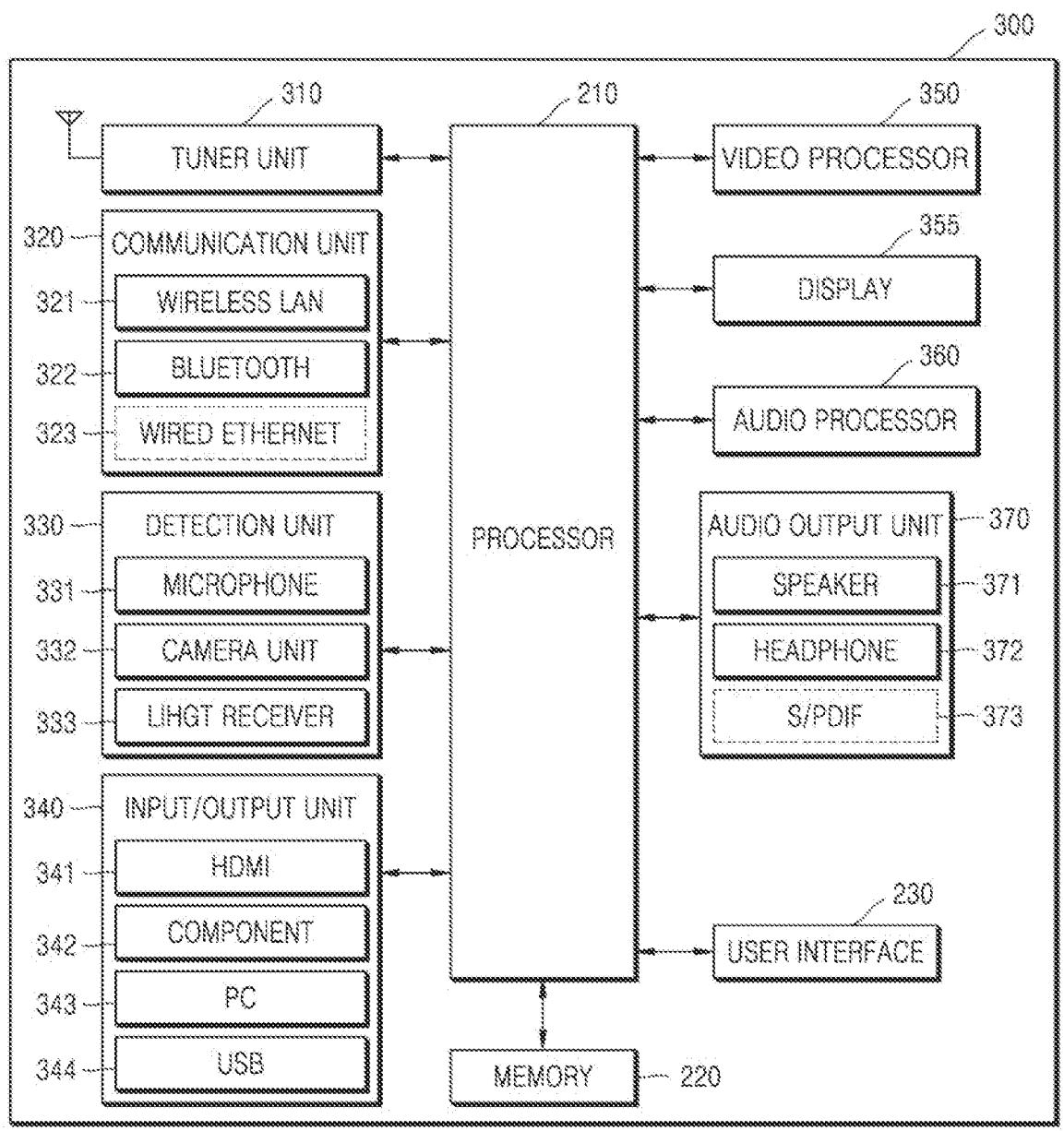
FIG. 3 is a block diagram of an electronic apparatus according to an embodiment.

FIG. 3 is a block diagram of an electronic apparatus 300 according to an embodiment.

Referring to FIG. 3, the electronic apparatus 300 may include the processor 210, the memory 220, the user interface 230, a tuner unit 310, a communication unit 320, a detection unit 330, an input/output unit 340, a video processor 350, a display 355, an audio processor 360, and an audio output unit 370.

The electronic apparatus 300 of FIG. 3 may include components of the electronic apparatus 200 of FIG. 2. Therefore, descriptions of the processor 210, the memory 220, and the user interface 230 overlapping those described with reference to FIG. 2 are omitted.

The electronic apparatus 300 of FIG. 3 may be an image display device having a recording function. For example, the electronic apparatus 300 may include at least one of a digital TV, a desktop computer, a smartphone, a tablet PC, a mobile phone, a video phone, an e-book reader, a laptop PC, a netbook computer, a digital camera, a personal digital assistant (PDA), a portable multimedia player (PMP), a camcorder, a navigation device, a wearable device, a smart watch, a home networking system, a security system, or a medical device.

The tuner unit 310 may tune and select only a frequency of a channel to be received by the electronic apparatus 300 from among a plurality of wave components by performing amplification, mixing, and resonance on broadcast content that is received by wire or wirelessly. The content received through the tuner 310 is subjected to decoding (e.g., audio decoding, video decoding, or additional information decoding) and is divided into an audio, a video, and/or additional information. The audio, the video, and/or the additional information may be stored in the memory 220 under control by the processor 210.

The communication unit 320 may connect the electronic apparatus 300 to an external device or a server under control by the processor 210. The electronic apparatus 300 may download a program or an application required by the electronic apparatus 300 from the external device or the server or may perform web browsing through the communication unit 320.

The communication unit 320 may include one of a wireless local area network (LAN) 321, Bluetooth 322, and wired Ethernet 323 corresponding to the performance and structure of the electronic apparatus 300. Also, the communication unit 320 may include a combination of the wireless LAN 321, the Bluetooth 322, and the wired Ethernet 323. The communication unit 320 may receive a control signal through a control device, such as a remote controller, under control by the processor 210. The control signal may be implemented as a Bluetooth type, an RF signal type, or a Wi-Fi type. The communication unit 320 may further include other short-range communication (e.g., near-field communication (NFC) and Bluetooth low energy (BLE)) in addition to the Bluetooth 322. According to an embodiment, the communication unit 320 may transmit and receive a connection signal to and from an external device or the like through Bluetooth 322 or short-range communication such as BLE.

The detection unit 330 may detect a user's voice, a user's image, or a user's interaction, and may include a microphone 331, a camera unit 332, and a light receiver 333. The microphone 331 may receive a user's uttered voice, may covert the received voice into an electrical signal, and may output the electrical signal to the processor 210.

The camera unit 332 may include a sensor and a lens, and may capture an image formed on a screen.

The light receiver 333 may receive an optical signal (including a control signal). The light receiver 333 may receive an optical signal corresponding to a user input (e.g., touching, pressing, a touch gesture, a voice, or a motion) from a control device, such as a remote controller or a mobile phone. The control signal may be extracted from the received optical signal under control by the processor 210.

In an embodiment, the detection unit 330 may include a digital camera or scanner capable of recognizing a barcode or a QR code. The detection unit 330 may detect whether an image output through the display 355 includes a barcode or a QR code, using a digital camera or a scanner.

The input/output unit 340 may receive a video (e.g., a moving picture signal or a still image signal), an audio (e.g., a voice signal or a music signal), additional information (e.g., a description of content, a title of content, or a location where content is stored), and the like from external databases provided by content providers or servers under control by the processor 210. The additional information may include metadata about content.

The input/output unit 340 may include one of a high-definition multimedia interface (HDMI) port 341, a component jack 342, a PC port 343, and a universal serial bus (USB) port 344. The input/output unit 340 may include a combination of the HDMI port 341, the component jack 342, the PC port 343, and the USB port 344.

The video processor 350 may process image data to be displayed by the display 355 and perform various image processing operations, such as decoding, rendering, scaling, noise filtering, frame rate conversion, and resolution conversion, on the image data. The video processor 350 may process each of a plurality of pieces of content when receiving a request for a multi-view output.

The display 355 may display, on a screen, content provided by content providers. The display 355 may output a broadcast program received in real time on a screen, or may output a program of a VOD service received through streaming or downloading on a screen.

In an embodiment, the display 355 may output content in a single-view or multi-view mode. The display 355 may divide a screen into a plurality of sub-screens, and may display different pieces of content on the divided sub-screens, respectively, to provide the content in a multi-view mode. The display 355 may output the first content and the second content on the sub-screens, respectively.

When the display 355 is implemented as a touch screen, the display 355 may be used as an input device, such as a user interface, in addition to an output device. For example, the display 355 may include at least one of a liquid crystal display, a thin film transistor-liquid crystal display, an organic light-emitting diode, a flexible display, a three-dimensional (3D) display, or an electrophoretic display. In addition, according to an implementation type of the display 355, two or more displays 355 may be provided.

The audio processor 360 performs processing on audio data. The audio processor 360 may perform various types of processing, such as decoding, amplification, or noise filtering, on the audio data.

The audio output unit 370 may output an audio included in content received through the tuner unit 310, an audio input through the communication unit 320 or the input/output unit 340, and an audio stored in the memory 220 under control by the processor 210. The audio output unit 370 may include at least one of a speaker 371, a headphone output terminal 372, or a Sony/Philips digital interface (S/PDIF) output terminal 373.

The user interface 230 according to an embodiment may receive a user input for controlling the electronic apparatus 300. The user interface 230 may include various input devices including, but is not limited to, a touch panel for detecting a touch of a user, a button for receiving a push operation of a user, a wheel for receiving a rotation operation of a user, a keyboard, a dome switch, a microphone for voice recognition, and a motion detection sensor for sensing a motion. In addition, when the electronic apparatus 300 is operated by a remote controller, the user interface 230 may receive a control signal received from the remote controller.

According to an embodiment, a user may control the electronic apparatus 300 through the user interface 230 to allow the electronic apparatus 300 to perform various functions. The user may use the user interface 230 to allow the electronic apparatus 300 to record specific content or to reproduce recorded content.

Figure 4:
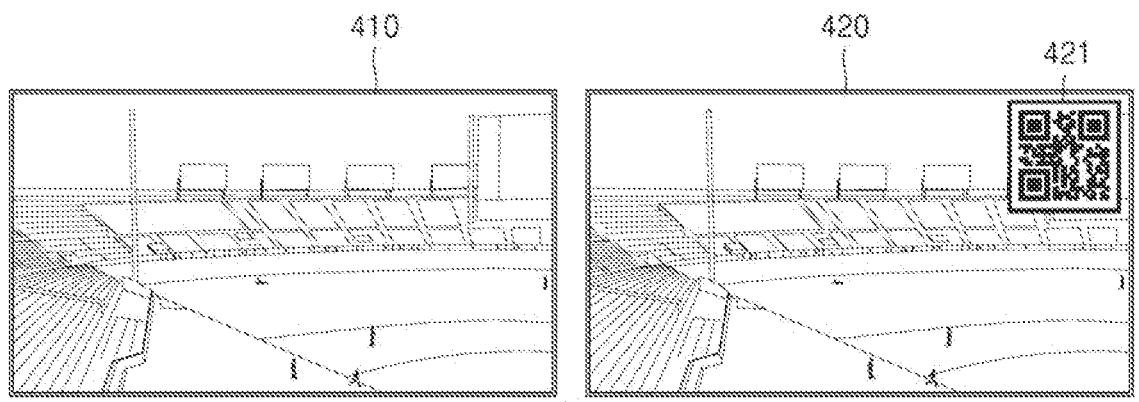
FIG. 4 is a diagram for explaining that an electronic apparatus identifies a multi-view, according to an embodiment.

FIG. 4 is a diagram for explaining that an electronic apparatus identifies a multi-view, according to an embodiment.

Referring to FIG. 4, the electronic apparatus may output one piece of content through a first screen 410. In FIG. 4, the electronic apparatus may output one piece of content in a single-view mode through the first screen 410.

The electronic apparatus may receive a TS from a content provider. In an embodiment, when demuxing a TS, the electronic apparatus may obtain a multi-view identifier from a header of the TS.

A TS may be demuxed into a video stream, an audio stream, and metadata. In an embodiment, the electronic apparatus may obtain a multi-view identifier from metadata. Alternatively, in an embodiment, the electronic apparatus may obtain a multi-view identifier from a frame in a process of obtaining a frame of content by decoding each video stream or audio stream.

In an embodiment, the multi-view identifier may be, but is not limited to, a QR code, a barcode, a digital watermark, or a packet, or may be in the form of a flag.

The multi-view identifier may include information about second content that is outputtable in multi-view together with first content. The information about the second content may include address information on a server capable of streaming the second content. Also, the multi-view identifier may include information about a time point at which the second content is outputtable in multi-view together with the first content.

In FIG. 4, when an image includes a multi-view identifier, the electronic apparatus may detect the multi-view identifier while outputting the first content as the first screen 410. In other words, the electronic apparatus may detect a multi-view identifier from an image output through a second screen 420 of FIG. 4. A multi-view identifier 421 in the form of a QR code is included in the image on the second screen 420.

In an embodiment, the electronic apparatus may include a digital camera or scanner capable of recognizing a barcode or a QR code. The electronic apparatus may detect a specific location of an image output on a screen, for example, a specific area of the screen, such as the upper right corner of the second screen 420 of FIG. 4, and thus, may detect a QR code or a barcode in the corresponding area.

In an embodiment, the multi-view identifier such as a QR code or a barcode may store information about the second content.

In an embodiment, the electronic apparatus may record content according to a user's request.

In an embodiment, when a multi-view identifier is detected while content is recorded, the electronic apparatus may identify the content as the first content that is outputtable in multi-view, and may obtain multi-view information from the multi-view identifier. The multi-view information is information for outputting the first content in multi-view, and may include at least one of the second content or an address of the second content on a server. Also, the multi-view information may include information about a time point at which the second content is output in multi-view together with the first content.

When a multi-view identifier is detected, the electronic apparatus may record the first content and simultaneously store multi-view information for outputting the first content in multi-view.

Figure 5:
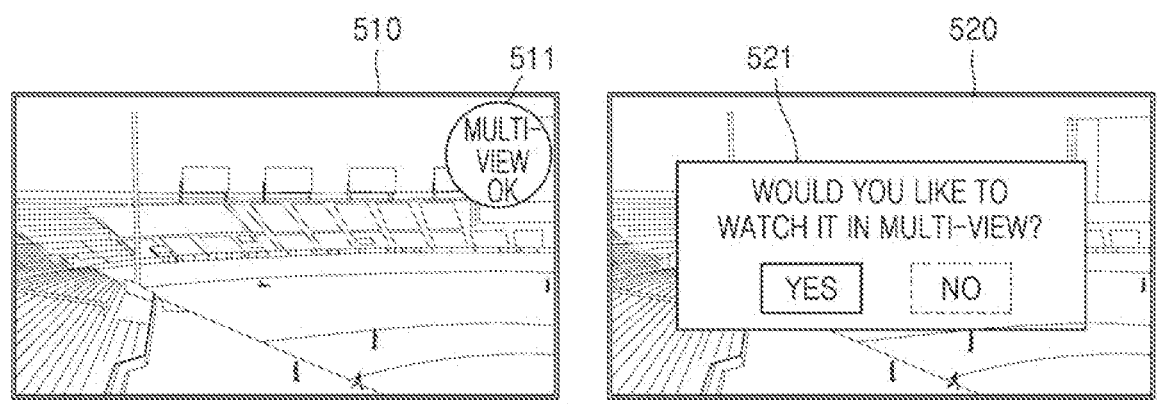
FIG. 5 is a diagram for explaining a method of displaying information indicating that a multi-view output is possible on a screen, according to an embodiment.

FIG. 5 is a diagram for explaining a method of displaying, on a screen, information indicating that a multi-view output is possible, according to an embodiment.

When the electronic apparatus detects a multi-view identifier for the first content, the electronic apparatus may notify a user through a pop-up screen, an interface screen, or the like that the user may watch the first content in multi-view.

Referring to FIG. 5, the electronic apparatus may output the first content in a single-view mode. When a multi-view identifier is detected, the electronic apparatus may generate identification information 511 for indicating that the first content is outputtable in multi-view, and may display the identification information 511 over the first content on a first screen 510. The size, location, transparency, color, shape, or the like of the identification information 511 may vary.

When a user sees the identification information 511 and selects an OK button using a user interface, the electronic apparatus may convert a screen of a single-view mode to a multi-view mode and output the screen.

The electronic apparatus may continue to output the identification information 511 until a time point at which a multi-view output is possible. Alternatively, the electronic apparatus may output the identification information 511 only for a certain amount of time from a time point at which the identification information 511 is output. When a user does not select the OK button for a certain amount of time, the electronic apparatus may no longer display the identification information 511 on the screen, or may output the identification information 511 in a smaller size or more transparently. When the electronic apparatus does not receive multi-view selection from a user, the electronic apparatus may continue to output content in a single-view mode.

In another embodiment, the electronic apparatus may output the first content on a second screen 520 and simultaneously generate an interface menu 521 for notifying that the first content is outputtable in multi-view, and may display the interface menu 521 over the first content. In FIG. 5, a case where the interface menu 521 displayed on the second screen 520 is displayed in the form of a text window on a partial area of the second screen 520 is described as an example. The size, output location, transparency, and/or shape of the interface menu 521 may vary.

When a user input of selecting "Yes" is received through the interface menu 521, the electronic apparatus may obtain, from a multi-view identifier, an address on a streaming server capable of streaming the second content. The electronic apparatus may stream the second content by accessing the obtained address on the server and output the second content in multi-view together with the first content.

When a user input of selecting "No" is received through the interface menu 521, the electronic apparatus may continue to maintain a currently output screen of a single-view mode.

In an embodiment, when a multi-view identifier is detected while the first content is recorded, the electronic apparatus may obtain multi-view information for outputting the first content in multi-view regardless of whether a user requests multi-view viewing, and may store the multi-view information together with the first content.

Figure 6:
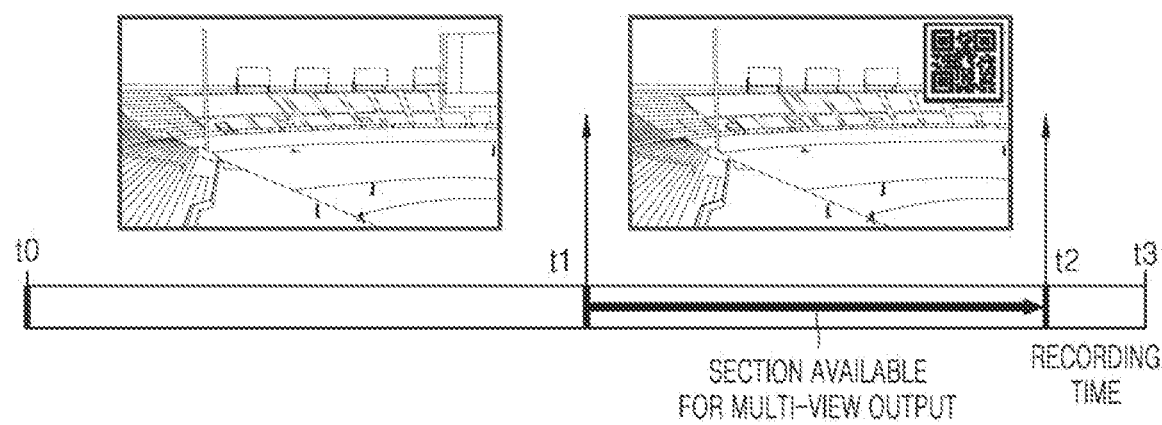
FIG. 6 is a diagram for explaining a timestamp according to an embodiment.

FIG. 6 is a diagram for explaining a timestamp according to an embodiment.

Referring to FIG. 6, the electronic apparatus may output the first content in a single-view mode. The electronic apparatus may output the first content in a single-view mode and simultaneously record the first content according to a user's request. In other words, the electronic apparatus may record the first content from t0 onwards, according to a user's request. In this regard, t0 may be the same as a time point at which the first content starts, but may also be a separate and arbitrary time point.

The electronic apparatus may detect a multi-view identifier. As shown in FIG. 6, when the multi-view identifier is a QR code, the electronic apparatus may identify that the first content is outputtable in multi-view by detecting the QR code from an image output on a screen.

In an embodiment, the multi-view identifier may include an address of the second content stored in a server.

When the multi-view identifier is detected, the electronic apparatus may obtain, from the multi-view identifier, an address of the second content on a streaming server, and may obtain the second content by accessing the obtained address and streaming the second content from the server.

Alternatively, the electronic apparatus may obtain, from the multi-view identifier, an address of the second content stored in a VOD server.

The electronic apparatus may generate, as multi-view information, the second content or the address of the second content on the VOD server, and may store the multi-view information in a storage space where the first content is stored. In other words, regardless of whether a user requests a multi-view output, when content that is being recorded is outputtable in multi-view, the electronic apparatus may obtain and store more multi-view information.

In an embodiment, the electronic apparatus may obtain, from the detected QR code, information about a time point at which the first content and the second content are outputtable together in multi-view. When a time point at which the first content starts to be outputtable in multi-view is t1, the electronic apparatus may output the first content in a multi-view mode according to a user's request from t1 onwards.

In an embodiment, the electronic apparatus may also obtain, from the detected QR code, information about a time point at which the first content is no longer outputtable in multi-view, that is, t2. In addition, the electronic apparatus may detect an identifier separate from the QR code, and may detect that a multi-view output is no longer possible from t2 onwards, using the separate identifier. After t2, the electronic apparatus may output the first content only in single view. After t2, the electronic apparatus no longer uses multi-view identification information.

In an embodiment, when recording the first content and the second content, the electronic apparatus may generate a timestamp for synchronizing the first content and the second content, and may input the timestamp to each content. In other words, when obtaining the second content in response to the detection of the multi-view identifier, the electronic apparatus may record the second content in synchronization with the first content. In this case, the electronic apparatus may input a timestamp for synchronizing two pieces of content for each frame of the content.

In an embodiment, the timestamp may include at least one of the total time to record the first content, for example, t3 in the example of FIG. 6, a time point at which recording of the first content is started, that is, t0, or a time point at which the second content is outputtable in multi-view based on a time point at which the first content starts to be recorded, that is, t1.

When multi-view information includes an address of the second content on a server, the electronic apparatus may store a timestamp of the second content together with the address of the second content on the server.

After the first content is recorded, when a user wants to watch the recorded first content in multi-view, the electronic apparatus may use timestamps of the first content and the second content to synchronize the two pieces of content and output them in multi-view.

Figure 7:
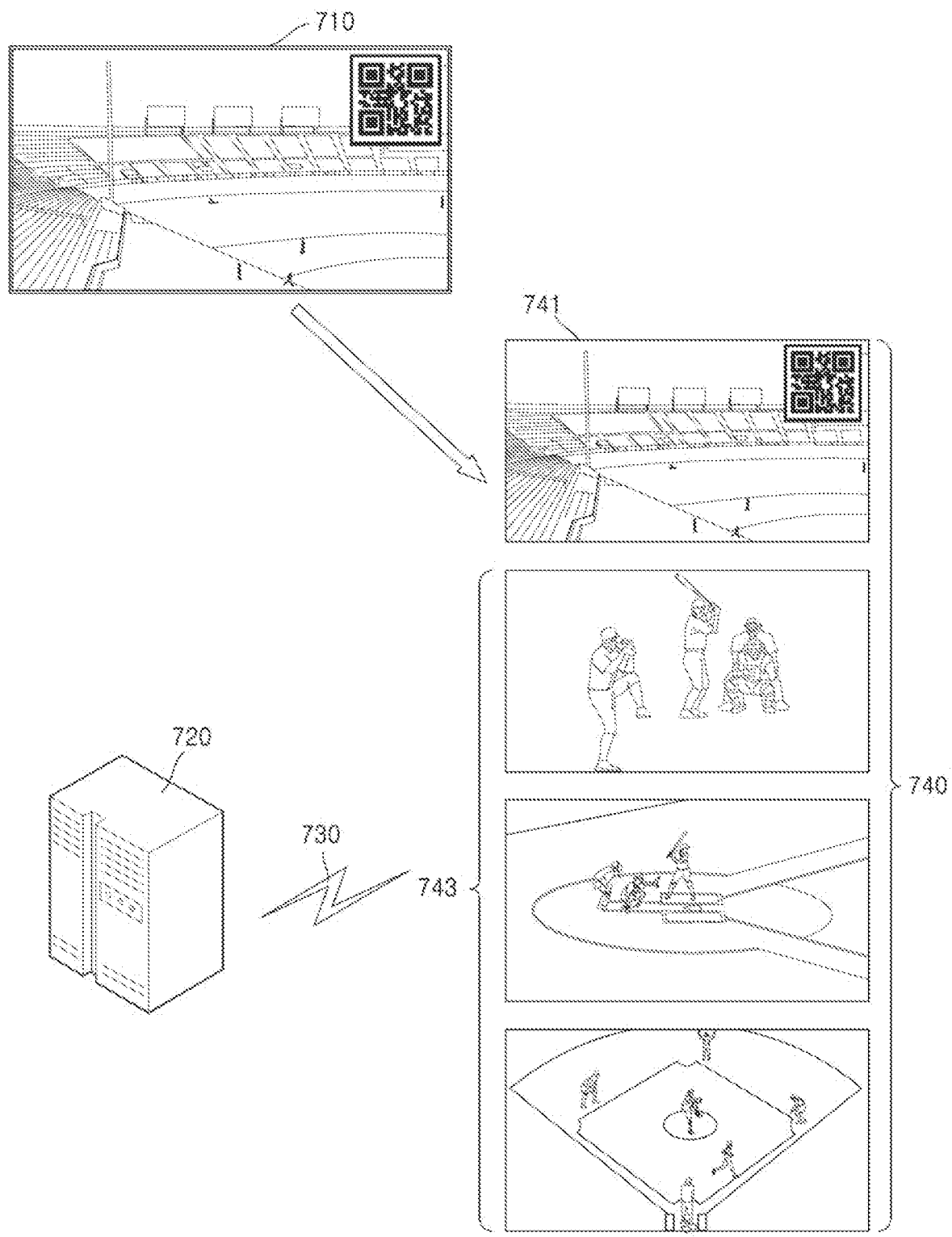
FIG. 7 is a diagram for explaining that second content is obtained when an electronic apparatus detects a multi-view identifier while recording first content, according to an embodiment.

FIG. 7 is a diagram for explaining that second content is obtained when an electronic apparatus detects a multi-view identifier while recording first content, according to an embodiment.

Referring to FIG. 7, the electronic apparatus may output first content 710 in a single-view mode. In an embodiment, the electronic apparatus may record the first content 710 according to a user's request.

The electronic apparatus may obtain a multi-view identifier for the first content while recording the first content. In this case, in an embodiment, the electronic apparatus may obtain multi-view information for outputting the first content in multi-view using the multi-view identifier.

In FIG. 7, the electronic apparatus may obtain, as a multi-view identifier, a QR code included in the first content 710, and may obtain therefrom information for outputting the first content in multi-view. In an embodiment, the multi-view identifier such as a QR code stores information about the second content related to the first content. For example, the multi-view identifier may include a URL on a streaming server 720 storing the second content.

The electronic apparatus may obtain an address of the second content on the streaming server 720 by using the multi-view identifier, and may stream second content 743 from the streaming server 720 by accessing an URL on the streaming server 720 through a communication network 730.

When receiving a multi-view viewing request from a user, the electronic apparatus may perform decoding on the second content 743 and output the decoded second content 743 in multi-view together with the first content.

In an embodiment, even when not receiving a multi-view viewing request from a user, the electronic apparatus may stream the second content 743 using the multi-view identifier and store the second content 743 in a storage. In other words, regardless of whether a multi-view output request is received from a user, the electronic apparatus may obtain multi-view information when a multi-view identifier is detected. The electronic apparatus may stream and decode the second content 743, and may input timestamp information to the decoded second content 743. The electronic apparatus may store content 740, that is, first content 741 and the second content 743, in the storage.

Figure 8:
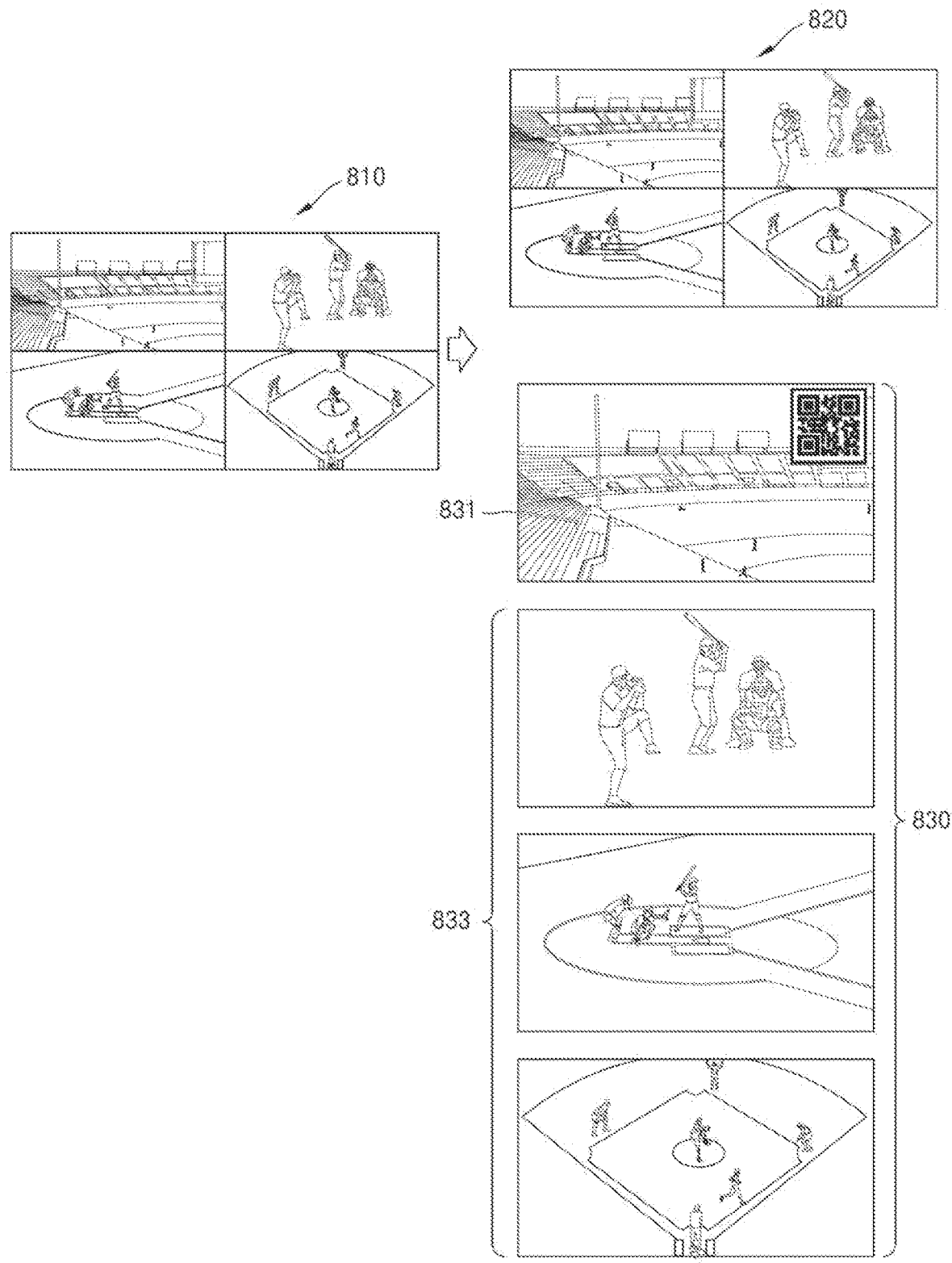
FIG. 8 is a diagram for explaining content that is recorded when an electronic apparatus outputs first content in multi-view, according to an embodiment.

FIG. 8 is a diagram for explaining content that is recorded when an electronic apparatus outputs first content in multi-view, according to an embodiment.

Referring to FIG. 8, the electronic apparatus may output the first content in multi-view according to a user's request. In addition, the electronic apparatus may record the first content according to the user's request.

The electronic apparatus may obtain information about second content related to the first content from a multi-view identifier to output the first content in multi-view in response to a multi-view output request. The electronic apparatus may obtain an address of the second content stored in a server by using the multi-view identifier, and may access the server by using the address and stream the second content. The electronic apparatus may perform decoding on the streamed second content and output the decoded second content in multi-view together with the first content.

Referring to FIG. 8, the electronic apparatus may output the first content and the second content together through a multi-view screen 810.

The electronic apparatus may record the first content in response to a request to record the first content. In an embodiment, when the first content is output in multi-view together with the second content, the electronic apparatus may record the multi-view screen 810 itself. In other words, in this case, content 820 recorded by the electronic apparatus may be the same as the multi-view screen 810 output by the electronic apparatus.

Alternatively, in another embodiment, the electronic apparatus may separately record first content 831 and second content 833 together with the multi-view screen 810 or without storing the multi-view screen 810. In other words, apart from outputting the first content and the second content as the multi-view screen 810, the electronic apparatus may store content 830 including the first content 831 and the second content 833 by separately recording the first content 831 and the second content 833.

In this case, after the first content is recorded in multi-view, when a user wants to watch the first content in single view rather than in multi-view, the electronic apparatus may read only the first content 831 from among the recorded content 830 and output the first content 831 in single view.

Also, while outputting the first content in single view, the electronic apparatus may output in multi-view one piece of content from among the second content, rather than the first content, according to a user's request. Alternatively, while outputting a multi-view screen including the four pieces of content, the electronic apparatus may receive, from a user, a request to output a multi-view screen including three pieces of content. In this case, the electronic apparatus may read only a certain number of pieces of content from among the second content and output them as a multi-view screen.

As such, according to an embodiment, when the first content is output in multi-view, the electronic apparatus may allow a user to watch content in various manners in the future by recording a multi-view screen itself or separately recording the first content and the second content.

Figure 9:
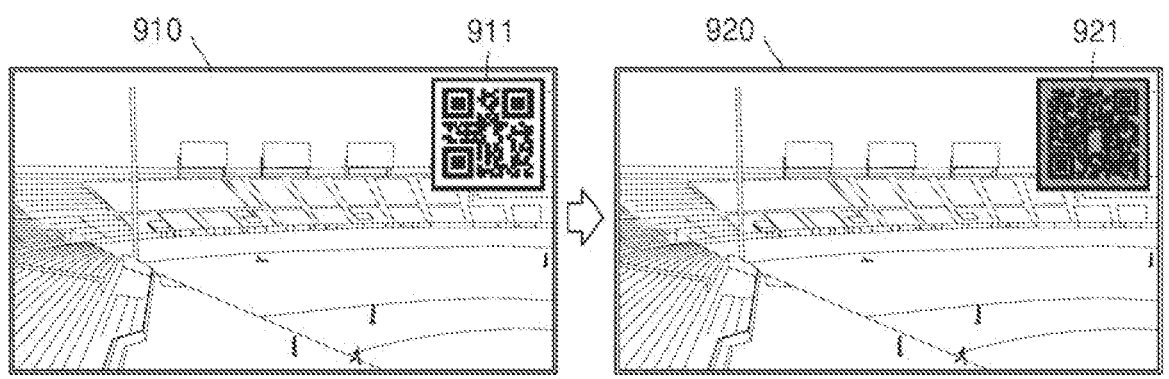
FIG. 9 is a diagram for explaining that an electronic apparatus obtains, from a multi-view identifier, an address of second content on a video on demand (VOD) server, according to an embodiment.

FIG. 9 is a diagram for explaining that an electronic apparatus obtains, from a multi-view identifier, an address of second content on a VOD server, according to an embodiment.

Referring to FIG. 9, the electronic apparatus may output first content on a first screen 910 in single view. As shown in FIG. 9, when an image of the first content includes a QR code 911, the electronic apparatus may identify the QR code 911 as a multi-view identifier.

In an embodiment, the multi-view identifier such as a QR code may store information about the second content related to the first content. The information about the second content may be a URL on a streaming server storing the second content.

As described above, the content providers may generate the first content and the second content that is outputtable in multi-view together with the first content. In this case, the second content may be stored in a streaming server or a VOD server. In other words, when the first content is a live signal, the content providers may temporarily store the second content that is outputtable live in multi-view together with the first content, in real time in the streaming server.

The streaming server transmits content to a plurality of users in real time, and stores real-time live content for a certain amount of time and then deletes the content after the certain amount of time. In this case, the second content stored in the streaming server may be transferred to and stored in the VOD server. The VOD server may provide content to a user in a streaming or download manner at a time point that the user wants.

In an embodiment, when storing the second content together with the first content, the electronic apparatus may receive the second content from the streaming server by accessing an address of the second content stored in the streaming server. However, there may be a case where the second content may no longer be received from the streaming server after a certain amount of time.

In an embodiment, the multi-view identifier may also include the address of the second content on the VOD server, in addition to the address of the second content on the streaming server.

Alternatively, in another embodiment, the multi-view identifier may include only the address of the second content on the streaming server. In this case, the electronic apparatus may obtain the address of the second content on the VOD server by using the address of the second content on the streaming server. For example, the electronic apparatus may obtain a storage address of the second content on the VOD server by changing only an identifier of a specific location of a file name in the address of the second content on the streaming server included in the multi-view identifier according to a pre-determined rule. The electronic apparatus may store the storage address of the second content on the VOD server.

In FIG. 9, as one of methods of storing the storage address of the second content on the VOD server, the electronic apparatus may generate a new QR code 921 including the address of the second content on the VOD server. The new QR code 921 included in a second screen 920 may store information different from the QR code 911 that is included in the image of the first content and is included in the first screen 910.

The electronic apparatus may include, as on the second screen 920, the new QR code 921 including the address of the second content on the VOD server, at a location of the existing multi-view identifier on the screen of the first content, that is, at a location where the QR code 911 is output, and may store the new QR code 921 together with the first content.

After the first content is recorded, the electronic apparatus may obtain the new QR code 921 from the recorded first content in response to a multi-view output request from a user and may obtain the address of the second content on the VOD server using the new QR code 921, thereby streaming the second content from the VOD server. The electronic apparatus may output the second content streamed from the VOD server in multi-view together with the first content.

Figure 10:
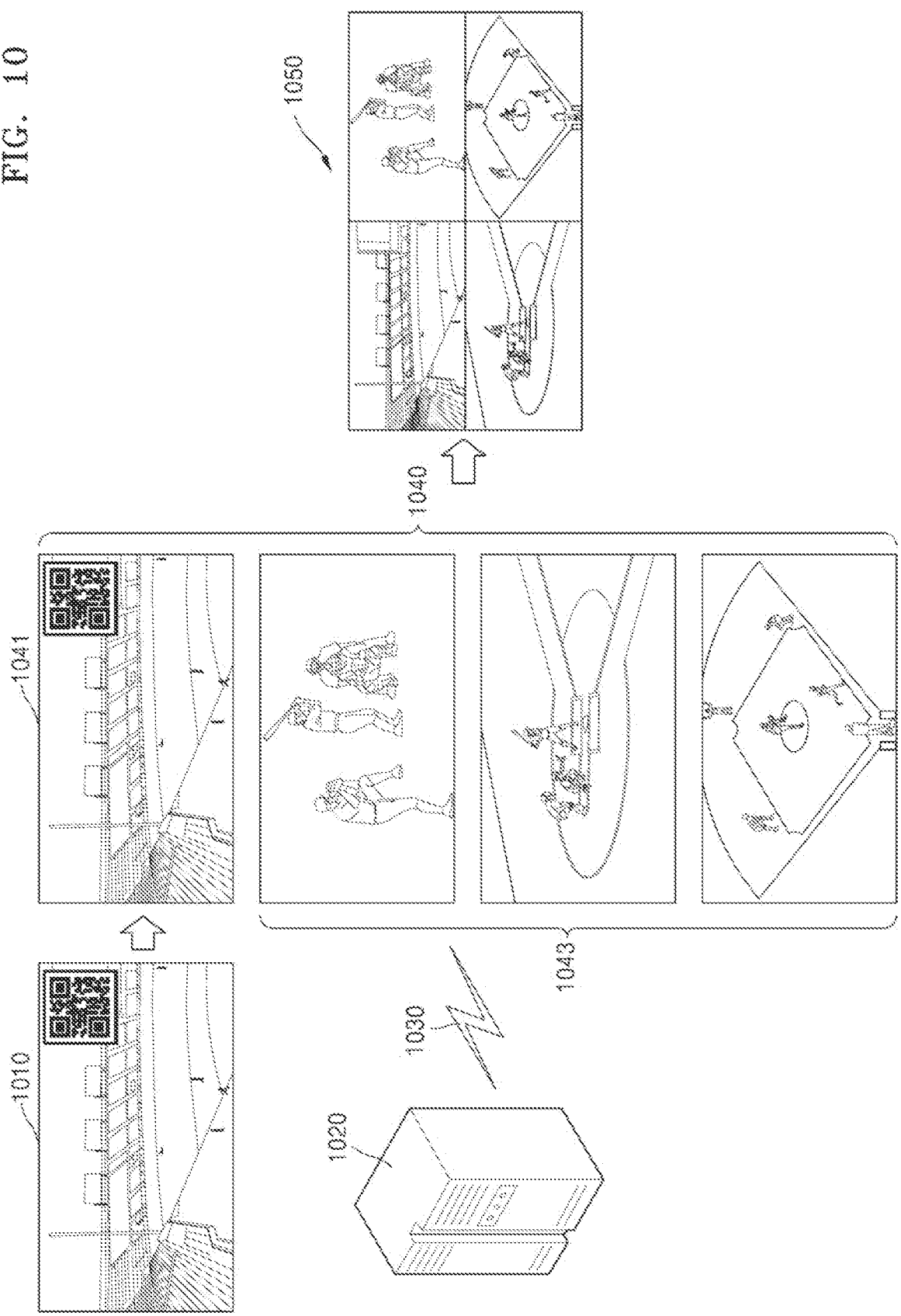
FIG. 10 is a diagram for explaining that recorded content is output in multi-view, according to an embodiment.

FIG. 10 is a diagram for explaining that recorded content is output in multi-view, according to an embodiment.

Referring to FIG. 10, first content 1010 may have already been recorded and stored in an electronic apparatus. The electronic apparatus may reproduce the recorded first content 1010 in single view in response to a user's request. When detecting a multi-view identifier and identifying that the first content 1010 is outputtable in multi-view, the electronic apparatus may inquire of the user whether to continue to output the first content in a single-view mode or to output the first content in multi-view.

When the user requests multi-view viewing, the electronic apparatus may determine whether second content related to the first content is pre-stored in the electronic apparatus. When the second content is not stored in the electronic apparatus, the electronic apparatus may read an address of the second content on a VOD server 1020, and may stream, from the VOD server 1020, second content 1043 through a communication network 1030 by accessing the VOD server 1020 by using the address.

The electronic apparatus may output a multi-view screen 1050 using content 1040 including pre-stored first content 1041 and the streamed second content 1043.

Figure 11:
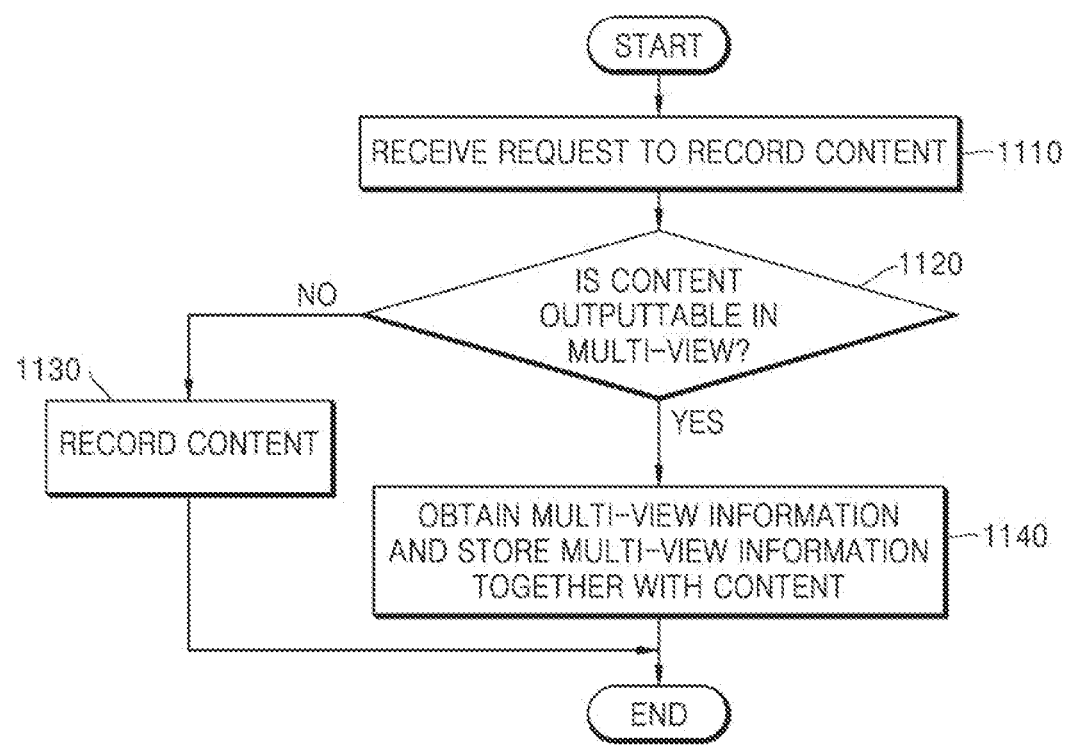
FIG. 11 is a flowchart for explaining a method of storing multi-view information, according to an embodiment.

FIG. 11 is a flowchart for explaining a method of storing multi-view information, according to an embodiment.

Referring to FIG. 11, an electronic apparatus may receive a request to record content from a user (operation 1110).

While recording the content, the electronic apparatus may determine whether the content is outputtable in multi-view (operation 1120). In other words, when obtaining a multi-view identifier from at least one of a header of a TS, metadata, a frame of first content, or an image generated from the first content, the electronic apparatus may determine that the content is outputtable.

When the content is not outputtable in multi-view, the electronic apparatus may record only the content being recorded (operation 1130).

When detecting the multi-view identifier and determining that the content is outputtable in multi-view, the electronic apparatus may obtain multi-view information from the multi-view identifier. The electronic apparatus may store the multi-view information together with the content (operation 1140).

In an embodiment, the electronic apparatus may record the content regardless of outputting the content. In other words, even when the current content is not output on a screen, the electronic apparatus may record the content through scheduled recording or the like. Even in a case where the current content is not output on a screen, when a multi-view identifier is detected, the electronic apparatus may obtain and store multi-view information for outputting the content in multi-view.

Figure 12:
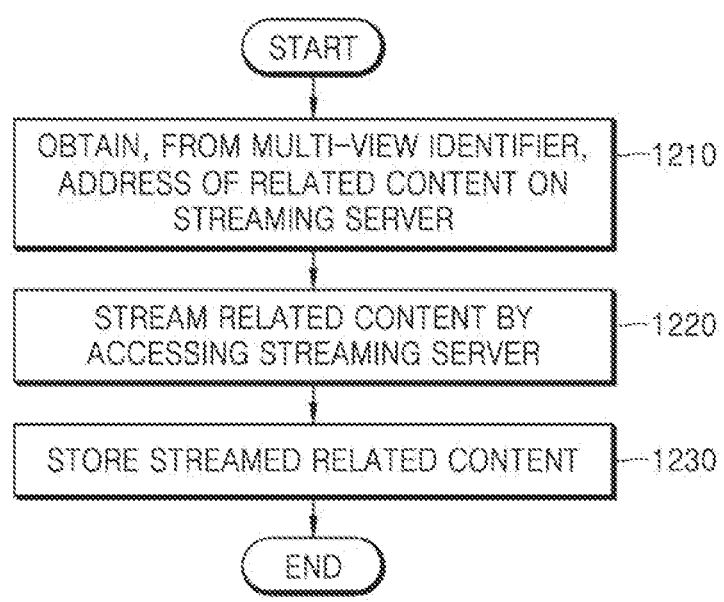
FIG. 12 is a flowchart illustrating a method, performed by an electronic apparatus, of obtaining multi-view information, according to an embodiment.

FIG. 12 is a flowchart illustrating a method, performed by an electronic apparatus, of obtaining multi-view information, according to an embodiment.

Referring to FIG. 12, the electronic apparatus may obtain a multi-view identifier for content while recording the content. In this case, the electronic apparatus may detect that the content may be output in multi-view, and may obtain multi-view information for outputting the content in multi-view from the multi-view identifier.

The multi-view identifier may include an address of content related to the content on a streaming server. In this case, the electronic apparatus may obtain, as the multi-view information, the address of the related content on the streaming server from the multi-view identifier (operation 1210).

The electronic apparatus may stream the related content by accessing the address on the streaming server obtained from the multi-view identifier (operation 1220).

The electronic apparatus may store the streamed related content in a storage in a memory (operation 1230).

Figure 13:
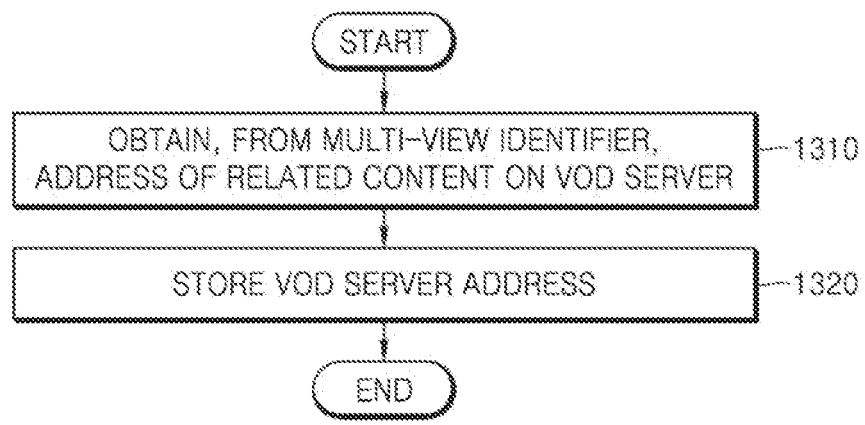
FIG. 13 is a flowchart illustrating a process, performed by an electronic apparatus, of obtaining multi-view information, according to an embodiment.

FIG. 13 is a flowchart illustrating a process, performed by an electronic apparatus, of obtaining multi-view information, according to an embodiment.

Referring to FIG. 13, the electronic apparatus may obtain a multi-view identifier while recording content. The electronic apparatus may obtain multi-view information from the multi-view identifier.

The electronic apparatus may obtain, as multi-view information, an address of related content on a VOD server, from a multi-view identifier (operation 1310). In other words, when the multi-view identifier includes a content address on a VOD server, the electronic apparatus may obtain the address on the VOD server from the multi-view identifier.

The electronic apparatus may store the address of the related content on the VOD server in a storage (operation 1320).

Figure 14:
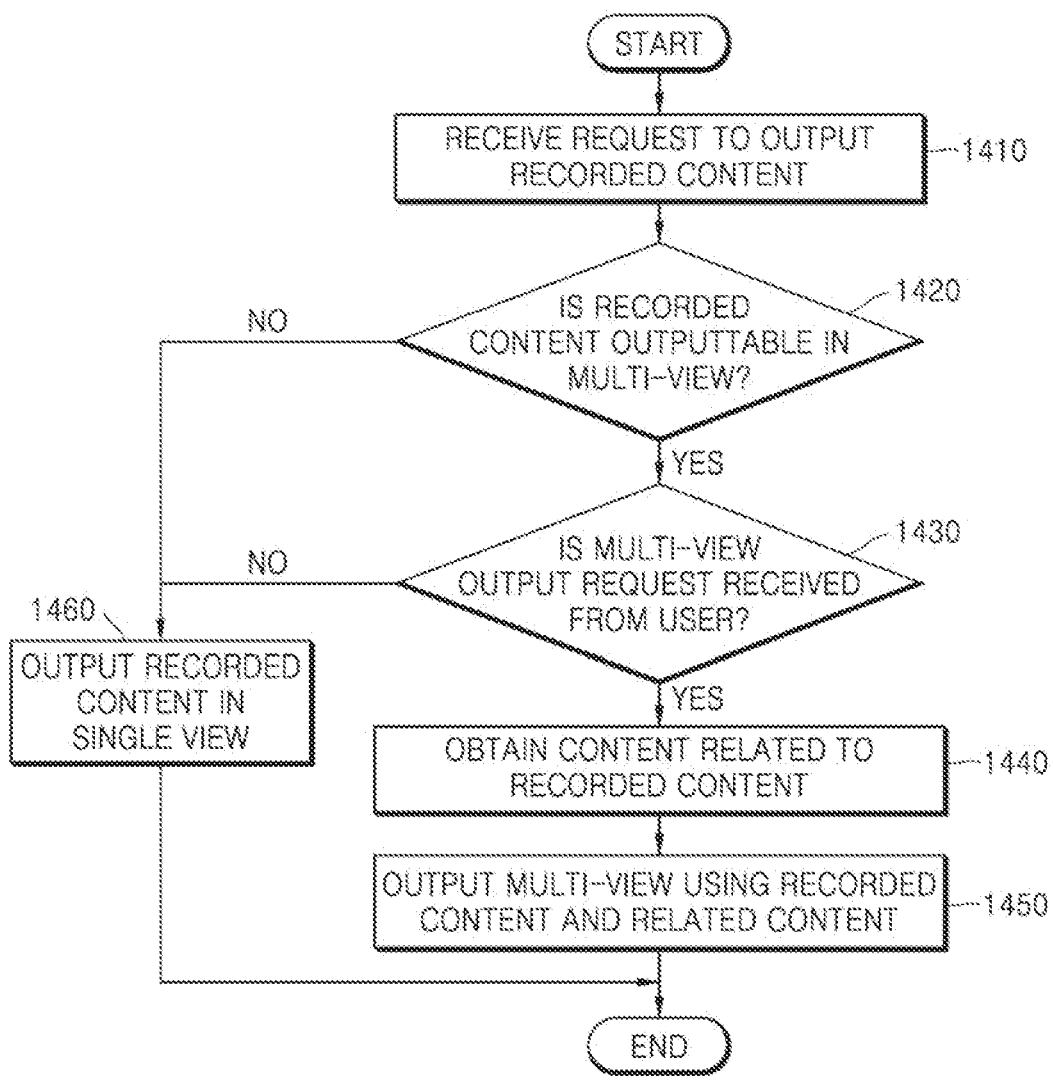
FIG. 14 is a flowchart for explaining a process of outputting recorded content, according to an embodiment.

FIG. 14 is a flowchart for explaining a process of outputting recorded content, according to an embodiment.

Referring to FIG. 14, it is assumed that an electronic apparatus has already recorded and stored content.

The electronic apparatus may receive a request to output the content that has already been recorded and stored (operation 1410).

The electronic apparatus may determine whether the recorded content is outputtable in multi-view (operation 1420). In other words, the electronic apparatus may identify whether the recorded content includes a multi-view identifier, and accordingly may determine whether the recorded content is outputtable in multi-view.

When the recorded content is outputtable in multi-view and a request to output content in multi-view is received from a user (operation 1430), the electronic apparatus may obtain content related to the recorded content (operation 1440). In other words, when the content related to the recorded content has already been stored in the electronic apparatus, the electronic apparatus may obtain the related content and output content in multi-view.

Alternatively, when the related content is not stored in the electronic apparatus, the electronic apparatus may determine whether an address storing the related content is stored in the electronic apparatus, and may obtain the address stored therein. The electronic apparatus may obtain second content by accessing a VOD server and streaming the related content from the VOD server by using the obtained address.

The electronic apparatus may output a multi-view using the recorded content and the related content (operation 1450).

When the recorded content is not outputtable in multi-view or a multi-view output request is not received from a user, the electronic apparatus may continue to output the recorded content in single view (operation 1460).

Figure 15:
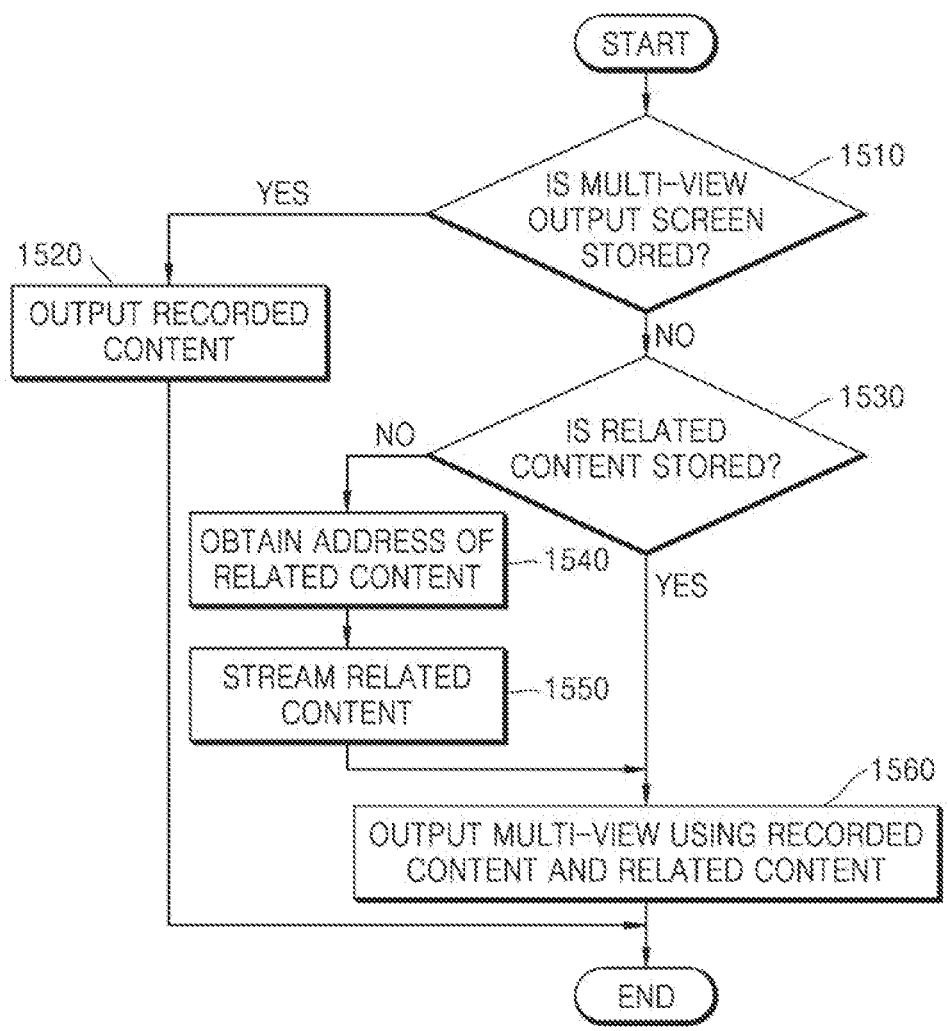
FIG. 15 is a flowchart for explaining a process of outputting recorded content, according to an embodiment.

FIG. 15 is a flowchart for explaining a process of outputting recorded content, according to an embodiment.

Referring to FIG. 15, it is assumed that an electronic apparatus has already recorded and stored content. Also, it is assumed that the electronic apparatus has received a request to output the recorded content in multi-view from a user.

The electronic apparatus may determine whether the recorded content is stored in the form of a multi-view output screen (operation 1510).

When the content is recorded in the form of the multi-view output screen, the electronic apparatus may read and reproduce the recorded content (operation 1520).

When the multi-view output screen is not stored, the electronic apparatus may determine whether related content is stored in the electronic apparatus (operation 1530).

When the related content is stored, the electronic apparatus may output a multi-view using the recorded content and the related content (operation 1560).

When the related content is not stored, the electronic apparatus may obtain an address of the related content (operation 1540) and may stream the related content from a server using the address of the related content (operation 1550).

The electronic apparatus may output the multi-view using the related content and the recorded content (operation 1560).

An electronic apparatus and an operating method thereof according to some embodiments of the disclosure may be implemented as a recording medium including instructions executable by a computer, such as a program module executed by a computer. A computer-readable medium may be an arbitrary available medium accessible by a computer, and examples thereof include all volatile and non-volatile media and separable and non-separable media. Also, examples of the computer-readable medium may include a computer storage medium and a communication medium. Examples of the computer storage medium include all volatile and non-volatile media and separable and non-separable media, which are implemented by an arbitrary method or technology, for storing information, such as computer-readable instructions, data structures, program modules, or other data. Examples of the communication medium generally include computer-readable instructions, data structures, program modules, other data of modulated data signals such as carrier waves, or other transmission mechanisms, and include arbitrary information transmission media.

In addition, the terms "unit" and "-er (-or)" used herein may be a hardware component such as a processor or a circuit and/or a software component executed in a hardware component such as a processor.

In addition, an operating method of an electronic apparatus according to an embodiment of the disclosure may be implemented as a computer program product including a recording medium having stored therein a computer program for performing an operating method of an electronic apparatus, the operating method including receiving a request to record first content, when the first content is outputtable in multi-view, obtaining multi-view information for outputting the first content in multi-view, and storing the multi-view information together with the first content.

While certain embodiments of the disclosure have been particularly shown and described, it will be understood by one of ordinary skill in the art that various changes in form and details may be made therein without departing from the spirit and scope of the disclosure as defined by the following claims. Hence, it will be understood that the embodiments of the disclosure should be considered in descriptive sense only and not for purposes of limitation. For example, each component described in a single type may be executed in a distributed manner, and components described distributed may also be executed in an integrated form.

What is claimed is:

1. A method of operating an electronic apparatus, the method comprising:
   receiving a request to record first content;
   obtaining a multi-view identifier with respect to the first content;
   based on the first content being outputtable in multi-view, obtaining multi-view information for outputting the first content in multi-view; and
   storing the multi-view information together with the first content,
   wherein the multi-view information comprises address information for accessing second content via a server, and
   wherein the obtaining the multi-view information comprises obtaining, from the multi-view identifier, the address information for accessing the second content on the server.

2. The method of claim 1, further comprising:
   obtaining the multi-view identifier from at least one of a header of a transport stream, metadata, a frame of the first content, or an image generated from the first content; and
   based on obtaining the multi-view identifier, identifying the first content as being outputtable in multi-view.

3. The method of claim 2,
   wherein the second content is related to the first content, and the server comprises at least one streaming server, and wherein the obtaining the multi-view information comprises:
accessing the at least one streaming server using the obtained address information to obtain the second content from the at least one streaming server.

4. The method of claim 2,
wherein the second content is related to the first content,
wherein the server comprises at least one video on demand (VOD) server, and
wherein the obtaining the multi-view information comprises obtaining, from the multi-view identifier, the address information for accessing the second content on the at least one VOD server.

5. The method of claim 3, wherein the multi-view information further comprises a timestamp for synchronizing the first content and the second content, and
wherein the timestamp comprises at least one of information about a total time to record the first content, information about a time point at which recording of the first content is started, or information about a time point at which the second content is outputtable in multi-view.

6. The method of claim 1, further comprising:
based on receiving a multi-view output request, obtaining the second content related to the first content;
outputting the first content and the second content in multi-view via a plurality of sub-screens of a display of the electronic apparatus; and
storing a screen output in multi-view.

7. A method of operating an electronic apparatus, the method comprising:
receiving a request to output recorded first content;
based on detecting a multi-view identifier in the first content, identifying that the first content is outputtable in multi-view;
based on the first content being outputtable in multi-view and a multi-view output request being received, outputting the first content and second content related to the first content in multi-view via a plurality of sub-screens of a display of the electronic apparatus,
wherein the second content is pre-stored in the electronic apparatus by being streamed from at least one streaming server based on an address obtained from the multi-view identifier.

8. The method of claim 7, wherein the outputting the first content and the second content in multi-view comprises reading and outputting a pre-stored multi-view output screen.

9. The method of claim 7, further comprising:
based on a multi-view output screen for the first content not being pre-stored, obtaining the second content by reading the second content that is pre-stored in the electronic apparatus.

10. The method of claim 7,
wherein the at least one streaming server comprises at least one video on demand (VOD) server, and the address comprises storage location information of the second content on the at least one VOD server.

11. The method of claim 7, further comprising:
obtaining a first timestamp associated with the first content and a second timestamp associated with the second content,
wherein the outputting the first content and the second content in multi-view comprises synchronizing the first content and the second content using the first timestamp and the second timestamp.

12. An electronic apparatus comprising:
a user interface;
at least one memory storing one or more instructions; and
at least one processor configured to execute the one or more instructions to:
receive a request to record first content through the user interface,
obtain a multi-view identifier with respect to the first content;
based on the first content being outputtable in multi-view, obtain multi-view information for outputting the first content in multi-view, and
store the multi-view information together with the first content in the at least one memory, and
obtain, from the multi-view identifier, address information for accessing second content via a server.

13. The electronic apparatus of claim 12, wherein the at least one processor is further configured to execute the one or more instructions to:
obtain the multi-view identifier from at least one of a header of a transport stream, metadata, a frame of the first content, or an image generated from the first content, and
based on obtaining the multi-view identifier, identify the first content as being outputtable in multi-view.

14. The electronic apparatus of claim 13, wherein the second content is related to the first content, and the server comprises at least one remote server,
wherein the at least one processor is further configured to execute the one or more instructions to:
obtain the second content by accessing the obtained address information on the at least one remote server, and
wherein the at least one remote server comprises at least one of a streaming server and a video on demand (VOD) server.

15. A non-transitory computer-readable medium having instructions stored therein, which when executed by a processor cause the processor to execute a method of operating an electronic apparatus, the method comprising:
receiving a request to record first content;
obtaining a multi-view identifier with respect to the first content;
based on the first content being outputtable in multi-view, obtaining multi-view information for outputting the first content in multi-view;
storing the multi-view information together with the first content,
wherein the multi-view information comprises address information for accessing second content via a server, and
wherein the obtaining the multi-view information comprises obtaining, from the multi-view identifier, the address information for accessing the second content on the server.

* * * * *